United States Patent [19]
Novak et al.

[11] Patent Number: 5,131,679
[45] Date of Patent: Jul. 21, 1992

[54] INITIATOR ASSEMBLY FOR AIR BAG INFLATOR

[75] Inventors: Conrad M. Novak; Brian R. Pitstick, both of Mesa; Jerome W. Emery, Tempe; Sanjeev M. Kulkarni, Mesa, all of Ariz.

[73] Assignee: TRW Inc., Lyndhurst, Ohio

[21] Appl. No.: 629,423

[22] Filed: Dec. 18, 1990

[51] Int. Cl.⁵ .............................. B60R 21/26
[52] U.S. Cl. .................... 280/736; 280/741; 102/530
[58] Field of Search ............ 280/743, 741, 740, 736, 280/728, 731, 737, 742, 729; 102/530, 531

[56] References Cited

U.S. PATENT DOCUMENTS

| | | | |
|---|---|---|---|
| 3,672,301 | 6/1972 | Abbott | 102/531 |
| 3,895,098 | 7/1975 | Pietz | 423/351 |
| 3,990,367 | 11/1976 | Smith | 102/531 |
| 4,278,638 | 7/1981 | Nilsson et al. | 422/166 |
| 4,530,516 | 7/1985 | Adams et al. | 280/741 |
| 4,600,123 | 7/1986 | Galbraith | 102/530 |
| 4,690,063 | 9/1987 | Grinier et al. | 102/530 |
| 4,722,551 | 2/1988 | Adams | 280/736 |
| 4,806,180 | 2/1989 | Goetz et al. | 149/5 |
| 4,858,956 | 8/1989 | Taxon | 251/129.07 |
| 4,902,036 | 2/1990 | Zander et al. | 280/736 |
| 4,913,212 | 5/1990 | Cuevas | 280/736 |
| 4,944,528 | 7/1990 | Nilsson et al. | 280/741 |

Primary Examiner—Mitchell J. Hill
Assistant Examiner—Paul Dickson
Attorney, Agent, or Firm—Tarolli, Sundheim & Covell

[57] ABSTRACT

An inflator for inflating an air bag includes a housing having a housing cover. A gas generating material is disposed within the housing. The gas generating material when ignited generates gas for inflating the air bag. An igniter is actuatable to ignite the gas generating material. A body of injection molded plastic material adheres to both the igniter and the cover to attach the igniter to the cover. The cover is welded to another part of the inflator housing.

9 Claims, 3 Drawing Sheets

INITIATOR ASSEMBLY FOR AIR BAG INFLATOR

BACKGROUND OF THE INVENTION

1. Technical Field

The present invention relates to a gas generating device, and particularly to an inflator for inflating an air bag to protect an occupant of a vehicle.

2. Description of the Prior Art

It is well known to protect a vehicle occupant using an air bag that is inflated when the vehicle encounters sudden deceleration, such as in a collision. The air bag restrains movement of the vehicle occupant during the collision. The air bag is typically inflated by gas generated by activation of gas generating material. The gas generating material is contained in an air bag inflator.

An air bag inflator commonly has an electrically actuatable igniter to ignite the gas generating material. The inflator includes structure for securing the igniter to the housing of the inflator. It is desirable to have a small, light weight, inexpensive, and easy to assemble structure for securing the igniter to the housing.

An inflator for an air bag which protects the driver of a vehicle is mounted in the vehicle steering wheel. Such an inflator is preferably small and light weight to minimize the rotating mass of the steering wheel assembly. The inflator should also, for ease of manufacture and low cost, have a minimal number of parts which are simple to assemble.

SUMMARY OF THE INVENTION

The present invention is an inflator for inflating an air bag. The inflator includes an inflator housing. A quantity of gas generating material is located in a chamber in the housing. The housing includes a cover for the chamber. The gas generating material when ignited generates gas for inflating the air bag. An igniter is actuatable to ignite the gas generating material.

The inflator includes means for securing the igniter to the housing. The securing means includes a plastic material for attaching the igniter to the housing cover. The plastic material adheres to both the igniter and the housing cover to attach the igniter to the housing cover. The housing cover is welded to another part of the inflator housing.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT OF THE INVENTION

Figure 1:
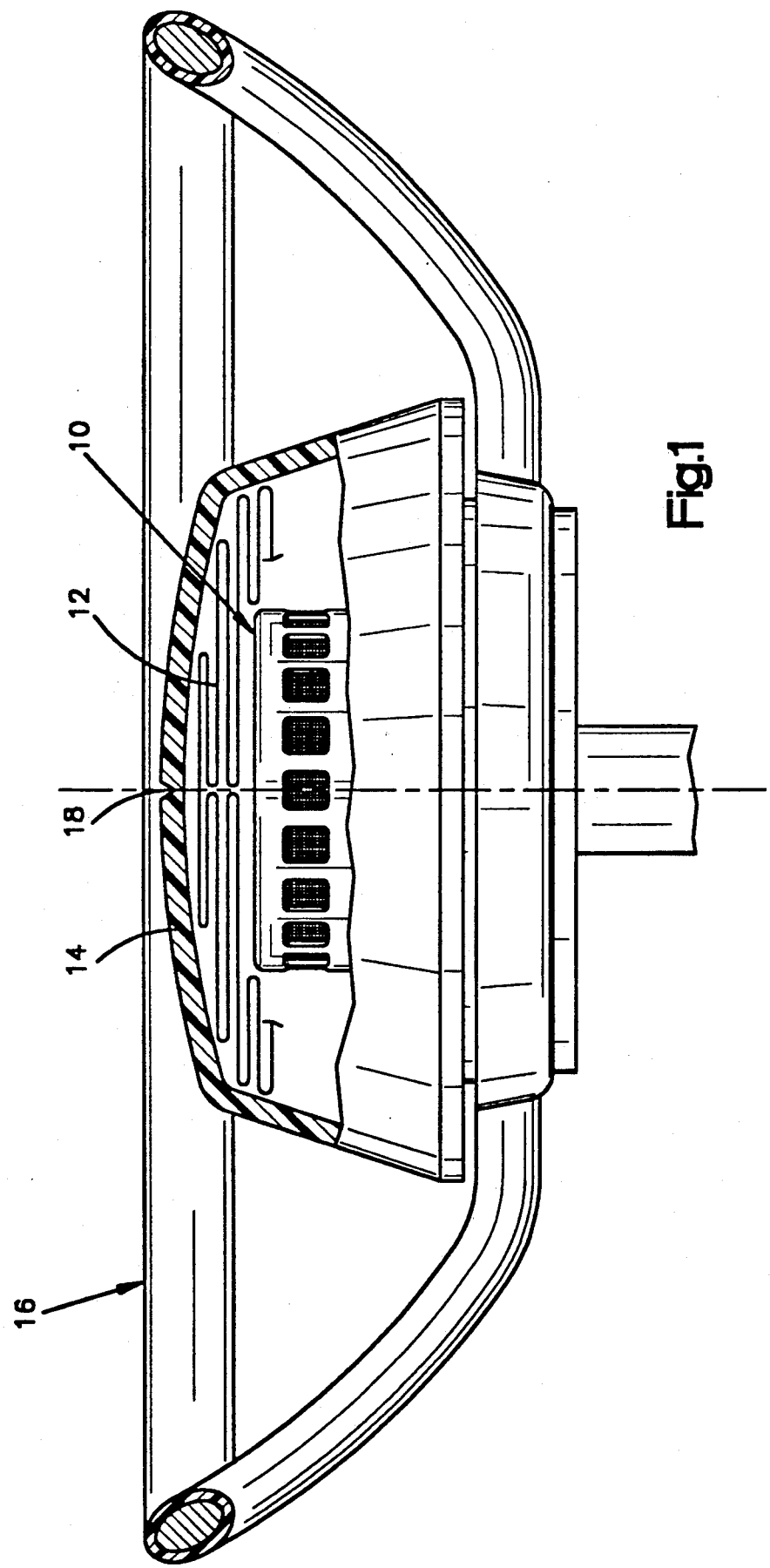
FIG. 1 is a transverse view, partially in section, of a vehicle steering wheel with an inflatable occupant restraint module incorporating an inflator constructed in accordance with the present invention.

The present invention relates to an air bag inflator and particularly to an inflator for inflating an air bag to protect the driver of a vehicle. The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of sudden vehicle deceleration, such as occurs in a collision, the inflator 10 is energized and produces a large volume of gas. The gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

Figure 2:
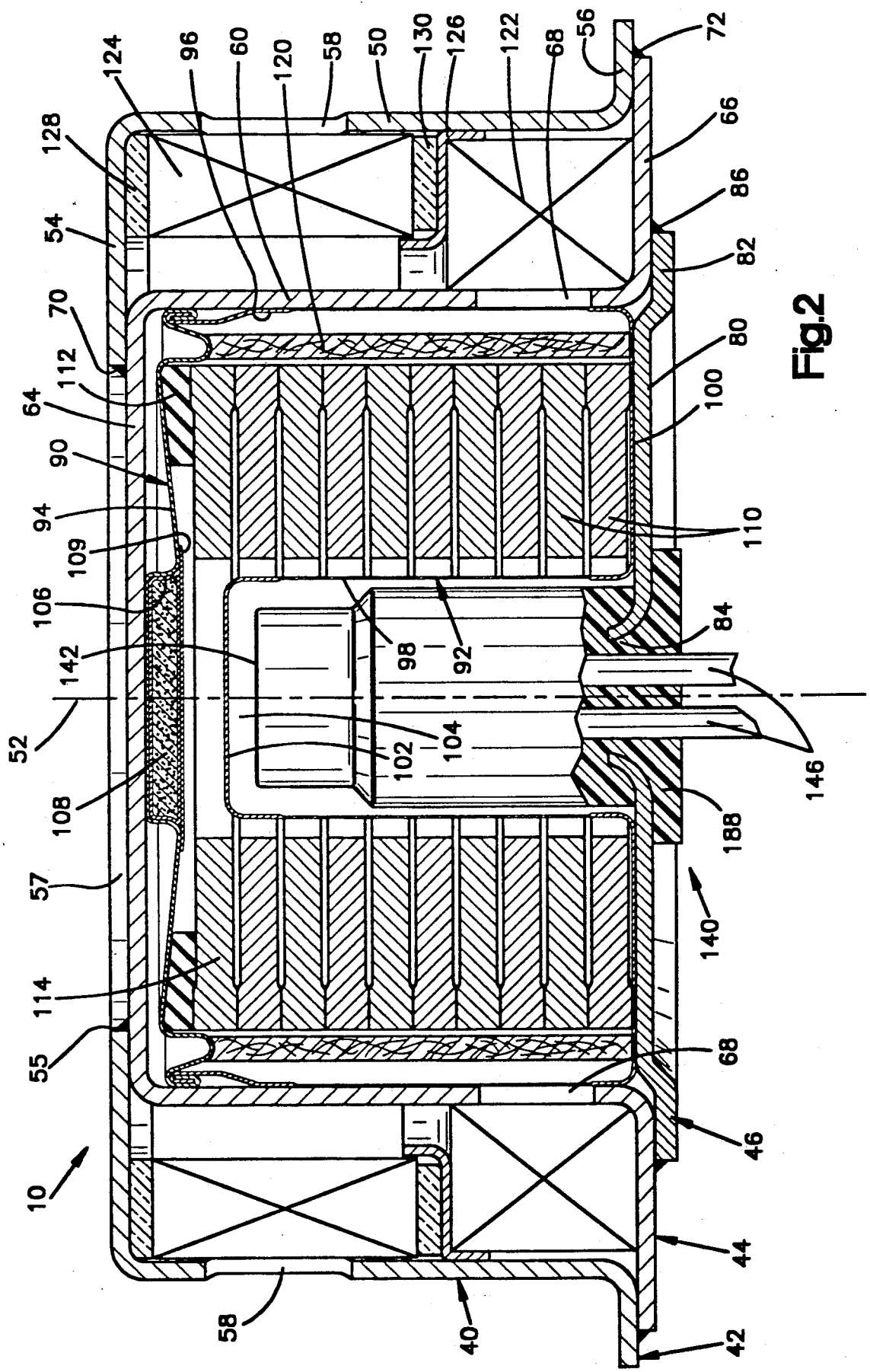
FIG. 2 is a transverse view, partially in section, of the inflator of FIG. 1.

The inflator 10 (FIG. 2) includes a housing 40. The housing 40 is made of three pieces, namely a diffuser cup 42, a combustion cup 44, and a combustion chamber cover 46. The diffuser cup 42, the combustion cup 44, and the combustion chamber cover 46 are made of a metal, such as AISI 301 stainless steel.

The diffuser cup 42 is generally cup-shaped and has a cylindrical side wall 50 extending around the central axis 52 of the inflator 10. The side wall 50 extends between a flat upper end wall 54 and a flat lower flange 56. An inner annular surface 55 on the upper end wall 54 of the diffuser cup 42 defines a central opening 57 in the upper end wall 54. The end wall 54 and the flange 56 are generally parallel to each other and perpendicular to the axis 52. An annular array of gas outlet openings 58 extends circumferentially around an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 are generally parallel to each other and perpendicular to the axis 52. An annular array of openings 68 extends circumferentially around a lower portion of the combustion cup side wall 60.

The upper end wall 64 of the combustion cup 44 is welded with a continuous weld to the annular surface 55 on the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber cover 46 is a generally flat metal piece having an annular planar portion 80 and a parallel but slightly offset annular outer flange 82. A circular opening 84 is located in the center of the chamber cover 46. The annular outer flange 82 of the chamber cover 46 is welded with a continuous weld to the combustion cup flange 66 at a circumferential weld location 86, again preferably by laser welding.

A hermetically sealed canister 90 is disposed in the combustion cup 44. The canister 90 is made of two pieces, namely a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion cup side wall 60. The side wall 96 has a reduced thickness in the area adjacent the openings 68 in the combustion cup side wall 60. The canister lower section 92 also has a cylindrical inner side wall 98 spaced radially inwardly from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inwardly from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tape 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which when ignited generates nitrogen gas. Although many types of gas generating material could be used, suitable gas generating materials are disclosed in U.S. Pat. No. 3,895,098. The gas generating material may alternatively be in the form of pellets or grains.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is radially outward of the openings 68 and lies against the combustion cup side wall 60. However, the slag screen 122 could be spaced away from the openings 68 in the combustion cup side wall 60.

An annular final filter assembly indicated schematically at 124 is located inside the diffuser cup 42 above the slag screen 122. The final filter assembly 124 is radially inward of the gas outlet openings 58 in the side wall 50 of the diffuser cup 42. The final filter assembly 124 is a plurality of layers of various materials. The layers extend around the diffuser cup side wall 50 and are located inside the side wall. The detailed structure of the final filter assembly 124 does not form a part of the present invention and therefore will not be described in detail.

An annular filter shield 126 projects radially inwardly from the diffuser cup side wall 50 and separates the final filter assembly 124 and the slag screen 122. An annular graphite seal 128 seals the gap between the upper edge of the final filter assembly 124 and the inside of the diffuser cup upper end wall 54. Another annular graphite seal 130 seals the gap between the lower edge of the final filter assembly 124 and the upper side of the filter shield 126.

The inflator 10 includes an initiator assembly 140. The initiator assembly 140 includes the igniter 142 which projects through the opening 84 in the chamber cover 46 into the central recess 104 of the canister 90.

The igniter 142 includes a pair of wire leads 146 which extend outwardly from the initiator assembly 140. The wire leads 146 are connectable to a collision sensor (not shown). The igniter 142 may be of any suitable well known construction.

Figure 3:
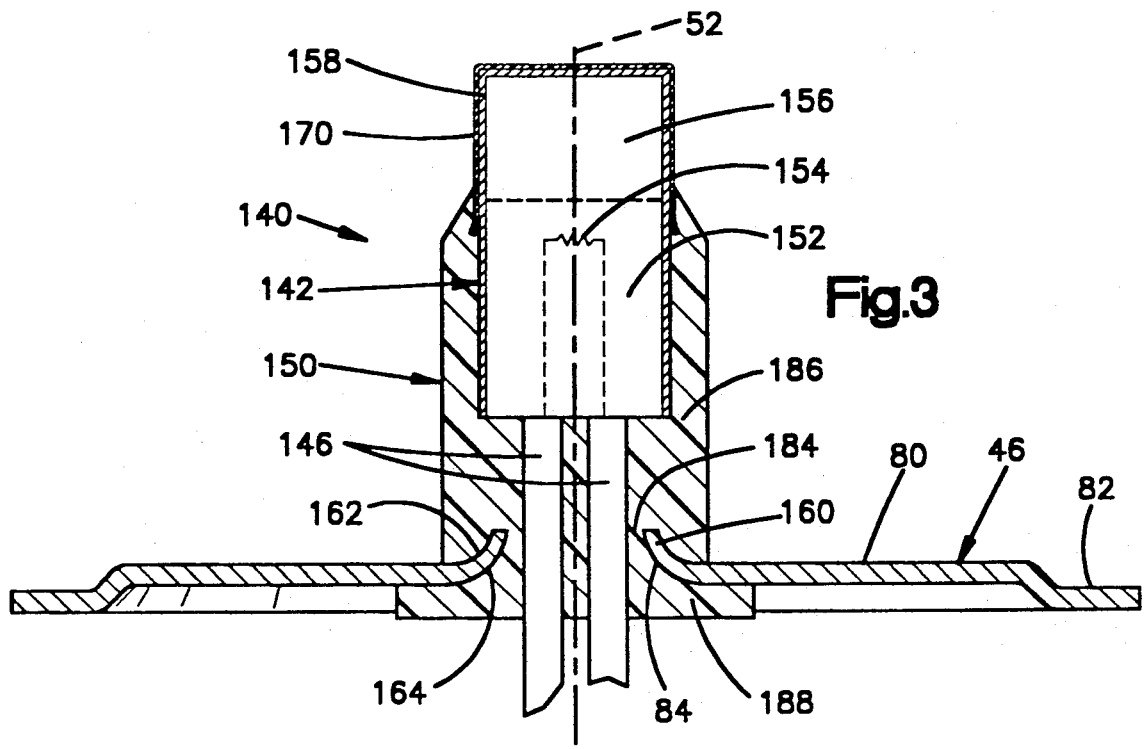
FIG. 3 is an enlarged view showing a portion of the inflator of FIG. 2.

As shown in FIG. 3, the igniter 142 includes an ignition charge 152. The lead wires 146 terminate in a resistance wire 154 located within the ignition charge 152. A body 156 of enhancer material, such as $BKNO_3$, is located above the ignition charge 152. A metal cap 158 encloses the enhancer material 156 and the ignition charge 152. Instead of lead wires, the igniter 142 could include pins (not shown) for connection to the collision sensor.

Upon the occurrence of a collision or other sudden vehicle deceleration, the collision sensor closes an electrical circuit. An electrical current then flows through the wire leads 146 and the resistance wire 154. The resistance wire 154 heats and ignites the ignition charge 152 which, in turn, ignites the enhancer material 156. Ignition of the enhancer material bursts the cap 158, releasing hot gas products which flow outwardly from the igniter 142 and rupture the inner top wall 102 and the inner side wall 98 of the canister 90. The hot gas from the igniter 142 ignites the disks 110 of gas generating material. The disks 110 of gas generating material rapidly produce a large volume of another hot gas.

The pressure of the gas acts on the cylindrical side wall 96 of the canister 90, forcing the side wall 96 radially outwardly against the combustion cup side wall 60. This results in the thin side wall 96 of the canister 90 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some combustion products of the initiator assembly 140 and of the gas generating disks 110. The prefilter 120 also cools the flowing gas. When the gas cools, molten products are plated onto the prefilter 120. The gas flows through the openings 68 and into the slag screen 122.

The slag screen 122 removes and traps particles from the flowing gas. The slag screen also cools the flowing gas. When the gas cools, molten combustion products such as metal are plated onto the slag screen 122. The filter shield 126 between the slag screen 122 and the final filter assembly 124 causes turbulent flow of gas to occur in and around the slag screen 122. The turbulent gas flow promotes the retention of relatively heavy particles in the slag screen 122 and in the lower portion of the diffuser cup 42.

The gas flows axially upwardly from the slag screen 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of gas into the air bag 12 to inflate the air bag 12.

In accordance with the present invention, the igniter 142 is secured to the cover 46 by means consisting of a body of injection molded plastic material 150. To facilitate engagement by the plastic material, the cover 46 includes an annular lip 160 which extends axially inwardly from the planar portion 80. The lip 160 defines the central opening 84 in the cover 46 through which the igniter 142 extends. The cover 46 also has an upper major side surface 162 and a lower major side surface 164.

The plastic material 150 extends around the outer circumference of the igniter 142 and covers all but an upper portion of the igniter 142. The plastic material 150 extends through the opening 84 in the cover 46, between the lip 160 on the cover 46 and the lead wires 146 of the igniter 142. The plastic material surrounds the lead wires 146. A portion 184 of the plastic material 150 is located in the opening 84 between the igniter 142 and the lip 160 of the cover 46. Another portion 186 of the plastic material 150 is located above the lip 160 on the cover 46. Yet another portion 188 of the plastic material 150 is located below the lip 160 on the cover 46.

The plastic material 150 is a structural member which, when it cools, adheres to both the cover 46 and the igniter 142. The plastic material 150 may be a polyphenylene sulfide resin, with a 40% glass fill, which can be obtained from Phillips 66 Plastics, under the brand name Ryton R4XE. Other materials which can be injection molded and which will adhere to the igniter 142 and the cover 46 are also suitable for use.

To secure the igniter 142 to the cover 46 (FIG. 3), the igniter 142 and the cover 46 are positioned relative to each other in a die (not shown). The igniter 142 extends through the opening 84 in the cover 46. The plastic material 150 in a molten form is injected into the die. The plastic material 150 adheres to the lip 160 and to the major side surfaces 162 and 164 of the cover 46.

After the igniter 142 is secured to the cover 46, the cover 46 is then welded to the combustion cup 44. The igniter 142 is thereby secured in position in the inflator 10. Also, the cover 46 closes the chamber in the inflator 10 containing the gas generating material 10.

With the igniter 142 secured in position in the inflator 10, the plastic material 150 engages the upper major side surface 162 of the cover 46, to block movement of the igniter 142 from its desired location in a direction axially outwardly of the inflator 10. This inhibits unauthorized or improper removal of the igniter 142 from the inflator 10. The plastic material 150 also engages the lower major side surface 164 of the cover 46, to block movement of the igniter 142 from its desired location in a direction into the inflator 10. This prevents the igniter 142 from inadvertently being pushed into the inflator 10.

Securing the igniter 142 to the cover 46 with the plastic material 150 and welding the cover 46 to the combustion cup 44 provides a barrier to prevent contamination in the interior of the inflator 10. Such a barrier is more difficult to obtain with the known threaded or crimped connections of the igniter to an inflator housing. Welding also provides a tamper resistant joint, to increase the difficulty of improper disassembly of the inflator. This, again, is advantageous over inflators which utilize a threaded or crimped connection for the igniter.

The injection molded plastic material 150 used to secure the igniter 142 to the cover 46 is very light in weight. The present invention thus provides an initiator assembly 140 which has a small number of parts, including only the igniter 142 and the plastic injection molding material 150. The cover 46 is easily welded directly to the combustion cup 44. This structure is relatively low in cost, light in weight, and easy to assemble.

Figure 4:
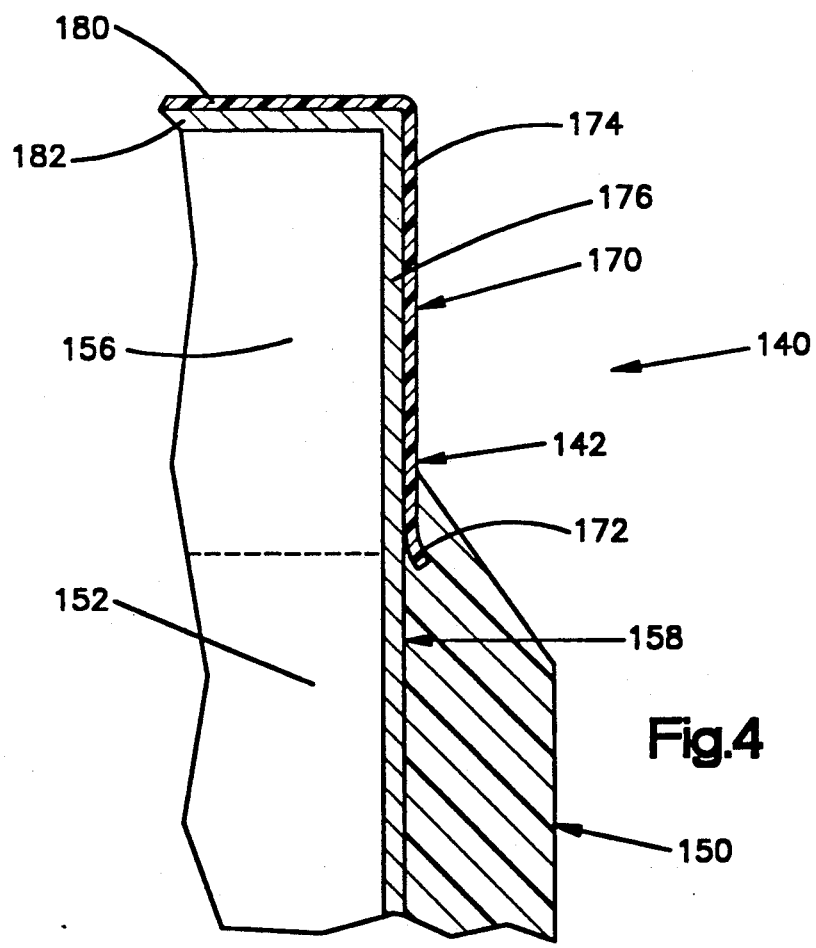
FIG. 4 is a further enlarged view of a portion of FIG. 3.

As shown in FIG. 4, a portion of the metal cap 158 on the igniter 142 is not covered by the plastic injection molded material 150. If the metal cap 158 contacts other metal portions of the inflator 10, such as the canister 90, the igniter 142 could become grounded, and the inflator 10 could be disabled. To prevent this from occurring, the metal cap 158 is covered by a thin plastic film 170 having its edge 172 embedded in the plastic material 150. A cylindrical portion 174 of the plastic film 170 overlies the cylindrical side wall 176 of the metal cap 158. A flat circular portion 180 of the plastic film 170 overlies a flat circular top wall 182 of the metal cap 158. The plastic film 170 electrically insulates the metal cap 158 of the igniter 142 from the surrounding metal parts of the inflator 10. The plastic film 170 may be Mylar ® plastic film about 0.125 mm thick.

From the above description of the invention, those skilled in the art will perceive improvements, changes and modifications. Such improvements, changes and modifications within the skill of the art are intended to be covered by the appended claims.

We claim:

1. Apparatus for inflating an air bag comprising:
   an inflator housing defining a chamber and including a cover for said chamber;
   gas generating material disposed within said chamber for, when ignited, generating gas for inflating the air bag;
   an igniter actuatable to ignite said gas generating material; and
   means for securing said igniter to said housing, said securing means consisting of a body of solidified injection molded plastic material at least partially disposed between said igniter and said cover and adhered to said igniter and said cover for attaching said igniter to said cover, a portion of said cover being embedded in said plastic material.

2. Apparatus as defined in claim 1 wherein said cover has surface means for defining an opening through which said igniter extends and a flange portion for attachment with another portion of the inflator housing by welding, and wherein said plastic material is located at least partially in said opening between said igniter and said cover and adhered to an outer surface of said igniter and to said surface means defining said opening through said cover.

3. Apparatus as defined in claim 1 wherein said cover has a generally planar main body portion and said surface means for defining said opening in said cover comprises surfaces on an annular lip extending axially from the plane of said main body portion into said chamber, said opening being located at a central location in said cover, said annular lip being embedded in said plastic injection molded material.

4. Apparatus as defined in claim 1 wherein said housing includes a member defining said chamber for said gas generating material, said cover being a generally flat circular plate larger in diameter than said chamber, said cover being welded to said member to close said chamber.

5. Apparatus for inflating an air bag comprising:
   an inflator housing defining a chamber and including a cover for said chamber;
   gas generating material disposed within said chamber for, when ignited, generating gas for inflating the air bag;

an igniter actuatable to ignite said gas generating material; and means for securing said igniter to said housing, said securing means consisting of plastic material for attaching said igniter to said cover;

said plastic material adhering to both said igniter and said cover and attaching said igniter to said cover;

said plastic material being a body of solidified injection molded material at least partially disposed between said igniter and said cover and adhered to said igniter and said cover;

said igniter comprising a metal cap having a portion protruding from said body of solidified injection molded material, and an electrically insulating material covering said protruding portion of said metal cap.

6. Apparatus for igniting gas generating material in a housing of an airbag inflator, said apparatus comprising:

a cover for said housing; and an igniter actuatable to ignite the gas generating material, a body of plastic injection molded material adhered to said igniter and to said cover to attach said igniter to said cover, a portion of said cover being embedded in said plastic material;

said igniter comprising a metal cap having a portion protruding from said body of solidified injection molded material, and an electrically insulating material covering said protruding portion of said metal cap.

7. Apparatus for inflating an air bag comprising:

an inflator housing including a cover;

gas generating material disposed within said housing for, when ignited, generating gas for inflating the air bag;

an igniter actuatable to ignite said gas generating material; and a body of solidified injection molded plastic material disposed between said igniter and said cover and adhered to said igniter and said cover to attach said igniter to said cover;

said igniter comprising a metal cap having a portion protruding from said body of solidified injection molded material, and an electrically insulating material covering said protruding portion of said metal cap.

8. Apparatus for inflating an air bag comprising:

an inflator housing defining a chamber and including a cover for said chamber;

gas generating material disposed within said chamber for, when ignited, generating gas for inflating the air bag;

an igniter actuatable to ignite said gas generating material; and means for securing said igniter to said housing, said securing means consisting of a body of solidified injection molded plastic material at least partially disposed between said igniter and said cover and adhered to said igniter and said cover for attaching said igniter to said cover, said cover having an annular central portion defining a central opening in said cover, said annular central portion of said cover having a first major side surface facing axially inward of said inflator, an opposed second major side surface facing axially outward of said inflator, and an end surface extending between said first and second major side surfaces, said igniter and said plastic material extending through said central opening in said cover, a first portion of said plastic material being adhered to said first major side surface of said cover to block axially outward movement of said igniter relative to said cover, a second portion of said plastic material being adhered to said second major side surface to block axially inward movement of said igniter relative to said cover, and a third portion of said plastic material being adhered to said end surface.

9. An apparatus as defined in claim 8 wherein said cover has a generally planar main body portion extending around said annular central portion, a radially inner portion of said annular central portion of the cover extending axially inward from the plane of said main body portion to form an annular lip extending around said igniter, said annular lip being surrounded and covered by said plastic material.

* * * * *